Sept. 18, 1962 P. BERRENBERG 3,054,487
ONE-REVOLUTION CLUTCH BRAKE
Filed March 3, 1960 6 Sheets-Sheet 2

Inventor:
Peter Berrenberg
BY Karl F. Ross
Agent

Sept. 18, 1962 P. BERRENBERG 3,054,487
ONE-REVOLUTION CLUTCH BRAKE
Filed March 3, 1960 6 Sheets-Sheet 6

Inventor:
Peter Berrenberg
BY Karl F. Ross
Agent 3,054,487
ONE-REVOLUTION CLUTCH BRAKE
Peter Berrenberg, Haan, Rhineland, Germany, assignor to Fa. Franz Berrenberg Maschinenfabrik-Eisengiesserei, Haan, Rhineland, Germany, a corporation of Germany
Filed Mar. 3, 1960, Ser. No. 12,637
Claims priority, application Germany Mar. 10, 1959
6 Claims. (Cl. 192—17)

My present invention relates to a one-revolution friction clutch.

Eccentric presses and other types of heavy machinery, wherein the momentum of a continuously rotating massive flywheel is intermittently imparted to a working member (e.g. a ram) of the machine, have been provided hitherto with friction clutches and the like adapted to connect the working member with the flywheel for a single operating cycle occurring during one revolution of the latter. These clutches generally comprise complex lever linkages and/or hydraulically or pneumatically actuated members adapted to urge friction surfaces carried by the shaft of the working member against a drum-like member attached to the flywheel. The operation of such clutches is seldom reliable in view of the complicated nature of the actuating devices required therefor.

It is an object of my invention, therefore, to provide an improved one-revolution friction clutch of simple, dependable and compact design.

It is another object of the invention to provide substantially foolproof automatic means for correctly timing the engagement and disengagement of a clutch of this type.

A clutch constructed in accordance with the broad aspects of the present invention comprises a control element rotatably carried on a driven or load shaft and adapted to urge a plurality of angularly spaced clutch segments, upon a forward rotation relative to the shaft, against a continuously rotating drive member such as a flywheel. The rotatable control element serves in addition as the receiver of the action of stationary brake means bearing thereupon whereby the clutching action occurs, under the action of a stored force (e.g. from a spring) tending to effect such relative forward rotation, upon the disengagement of the brake means from this element.

According to a more specific feature of the invention, the clutch segments are swingably carried by links pivoted to a clutch body which is rigidly secured to the load shaft and upon which the control element is journaled. Advantageously, the links are positively gripped by the control element to limit its angular displacement relative to the shaft.

According to another feature of my invention, the shaft and the control element are provided with a lost-motion coupling which prevents relative motion therebetween after the control element has been sufficiently retarded by the brake means, against the action of its clutch-actuating spring, to withdraw the clutch segments from the drive member in the course of a limited rearward rotation of the control element relative to the shaft. In this manner the braking action is exerted upon the shaft and its load in two stages, first through the intermediary of a spring and then by positive contact.

Still another feature of the invention resides in the provision of means controlled by the load shaft for insuring the engagement and disengagement of the clutch at the proper moment. In an eccentric press, for example, it is desirable to make the motion of the ram, in response to actuation of the press lever, independent (at least after the system has passed a certain point in its cycle) of the length of time during which the lever is held actuated by the operator. The shaft-controlled means, which may consist of a double cam on the load shaft itself, is adapted to act upon two followers respectively associated with a brake-release member and with the actuating lever therefor; its shape is advantageously such that the brake is maintained in its withdrawn position for the major part of a revolution while the lever is held inoperative until after the brake has been automatically re-applied by the associated cam so that the load is brought to substantially a full stop before another cycle is started. The cams may also afford a certain leeway for decoupling after a false start, as by locking the brake in its open position only after the shaft has rotated through an angle of, say, 120° from its normal starting point. The brake, for this purpose, may be operated by another stored force such as that of a spring whenever the brake-releasing member is allowed to return to its unoperated position.

The above and other objects, features and advantages of my present invention will become more readily apparent from the following description, reference being made to the accompanying drawing in which.

Figure 1:
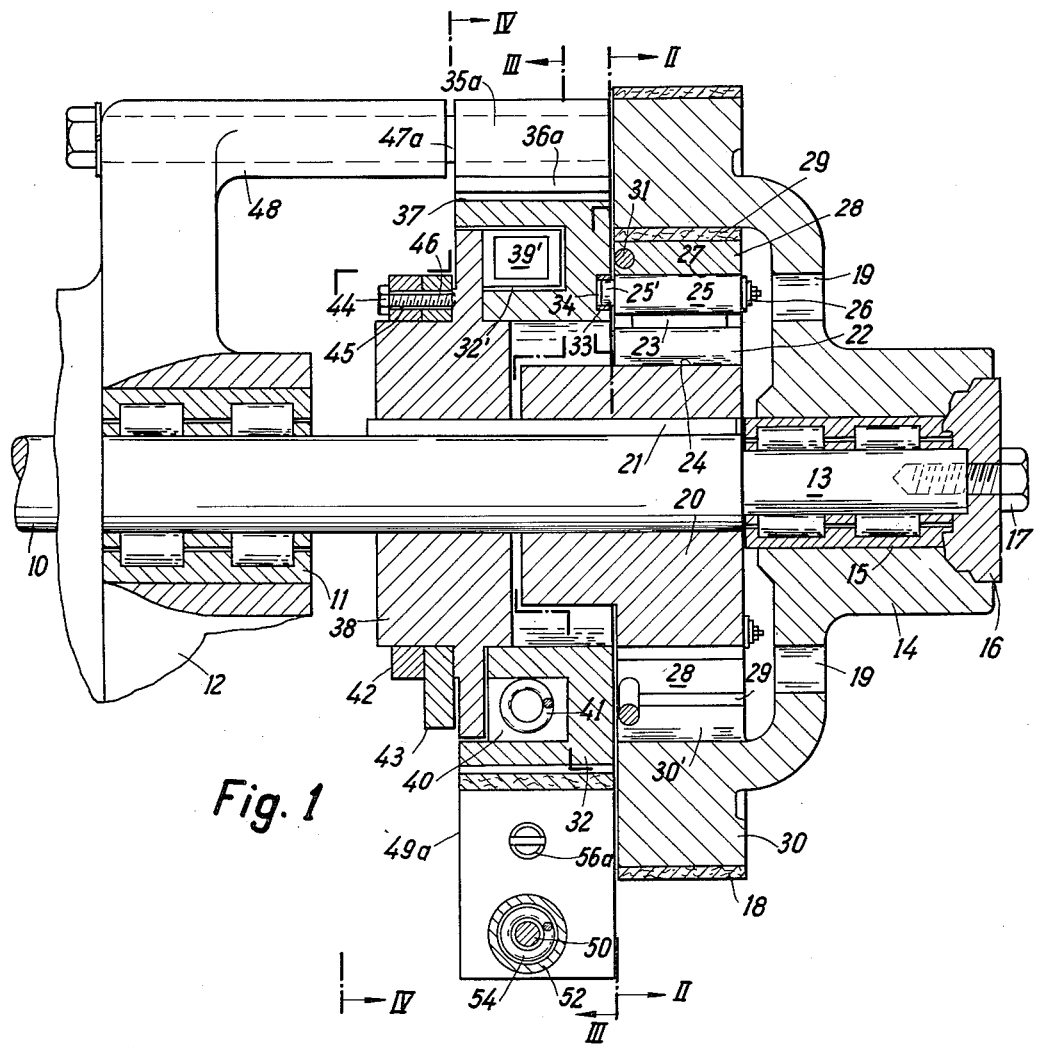
FIG. 1 is an axial cross-sectional view of a clutch according to the invention.
Figure 2:
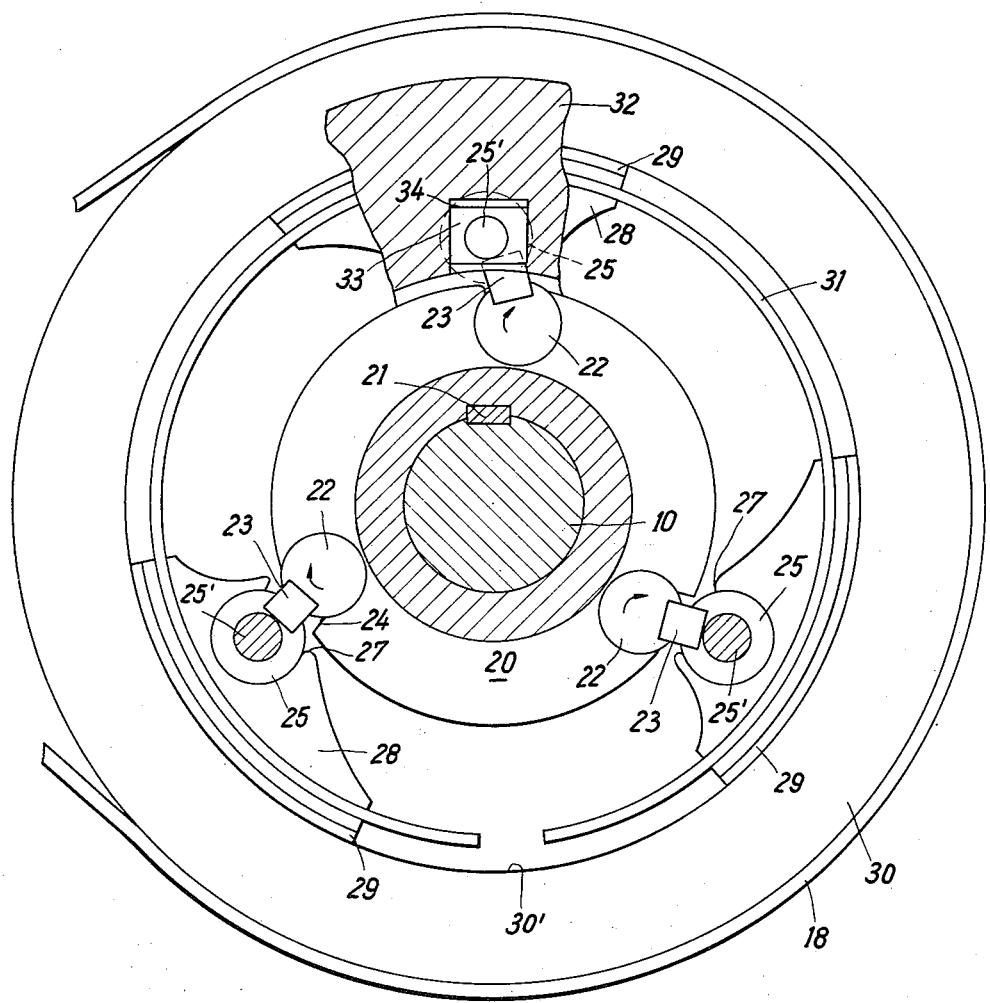
FIG. 2 is a cross-sectional view taken along line II—II of FIG. 1, with parts broken away.
Figure 3:
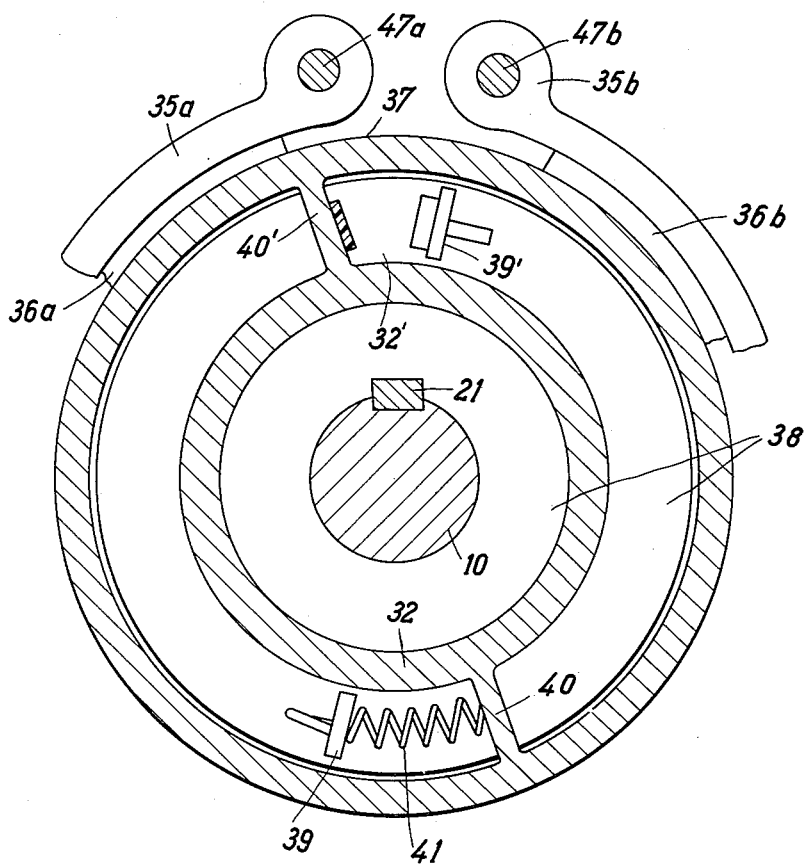
FIG. 3 is a cross-sectional view taken along line III—III of FIG. 1.

In the drawing I show a load shaft 10 assumed to be connected to the ram of an eccentric press not further illustrated, this shaft being journaled in a bearing 11 of the machine housing 12. Shaft 10 is provided with an extremity 13 upon which a flywheel 14 is journaled for free rotation by means of a bearing 15. The flywheel 14 is held on the shaft by a stop 16, fastened to the extremity 13 by a cap screw 17, and is driven by a belt 18, engaging its annular flange 30, from a motor not shown. The flywheel 14 is flanged to serve as part of a clutch housing, apertures 19 being provided therein to afford access to its interior. This housing surrounds a generally cylindrical sleeve or clutch body 20 rigidly secured to the shaft 10 by a key 21. Links 23 are pivotally received in recesses 24 angularly spaced along the periphery of clutch body 20, as best seen in FIG. 2. Each link 23 comprises a cylindrical inner extremity 22, swingably anchored in the corresponding recess 24, and a similar outer extremity 25, received in like manner in a recess 27 of a respective clutch segment 28; these cylindrical recesses embrace the extremities 22, 25 over more than 180°, thus insuring positive retention of the links 23. The outer surfaces of clutch segments 28 carry a lining 29, of a material with relatively high coefficient of friction and slip resistance, adapted frictionally to engage the inner peripheral wall 30' of the annular flange 30 of the flywheel 14 when the segments 28 are urged thereagainst. A split ring 31, of resilient material such as spring steel, passes through appropriately curved arcuate grooves in all of the segments 28 to maintain them substantially concentric with the flywheel. A control ring 32, journaled on clutch body 20 for limited relative angular motion, is provided with angularly spaced slots 34 each accommodating a sliding block 33 within which a stud 25', projecting from the outer extremity 25 of a respective link 23, is rotatably received as best seen in FIG. 2. Studs 25' are secured to the extremities 25 of the links 23 by nuts 26. A pair of brake shoes 35a, 35b are pivoted to the machine housing 12 at extensions 48 thereof by bolts 47a, 47b. The brake shoes 35a, 35b are provided with brake linings 36a, 36b adapted frictionally to engage the outer surface 37 of control ring 32. A limit disk 38, serving as another part of the clutch housing which is completed by the ring 32, is also keyed to the shaft 10. The disk 38 is provided with a block 39 to which a force-storing means in the form of a clutch-actuating spring 41 is rigidly affixed, the control ring 32 being formed with an annular channel 32' dimensioned to receive the block 39 and to permit a relative rotary motion of the disk 38 carrying the block. The latter serves to urge the compression spring 41 against a web 40 provided in channel 32', another such web 40' being engageable by an abutment 39', carried by the disk 38, after a limited relative rotation of ring 32 and disk 38 sufficient to compress the spring 41.

The clutch segments 28 may be designed to require a motion of only 0.3 to 0.5 mm. before they contact the flywheel 14, thereby insuring rapid actuation and disengagement of the clutch.

Figure 4:
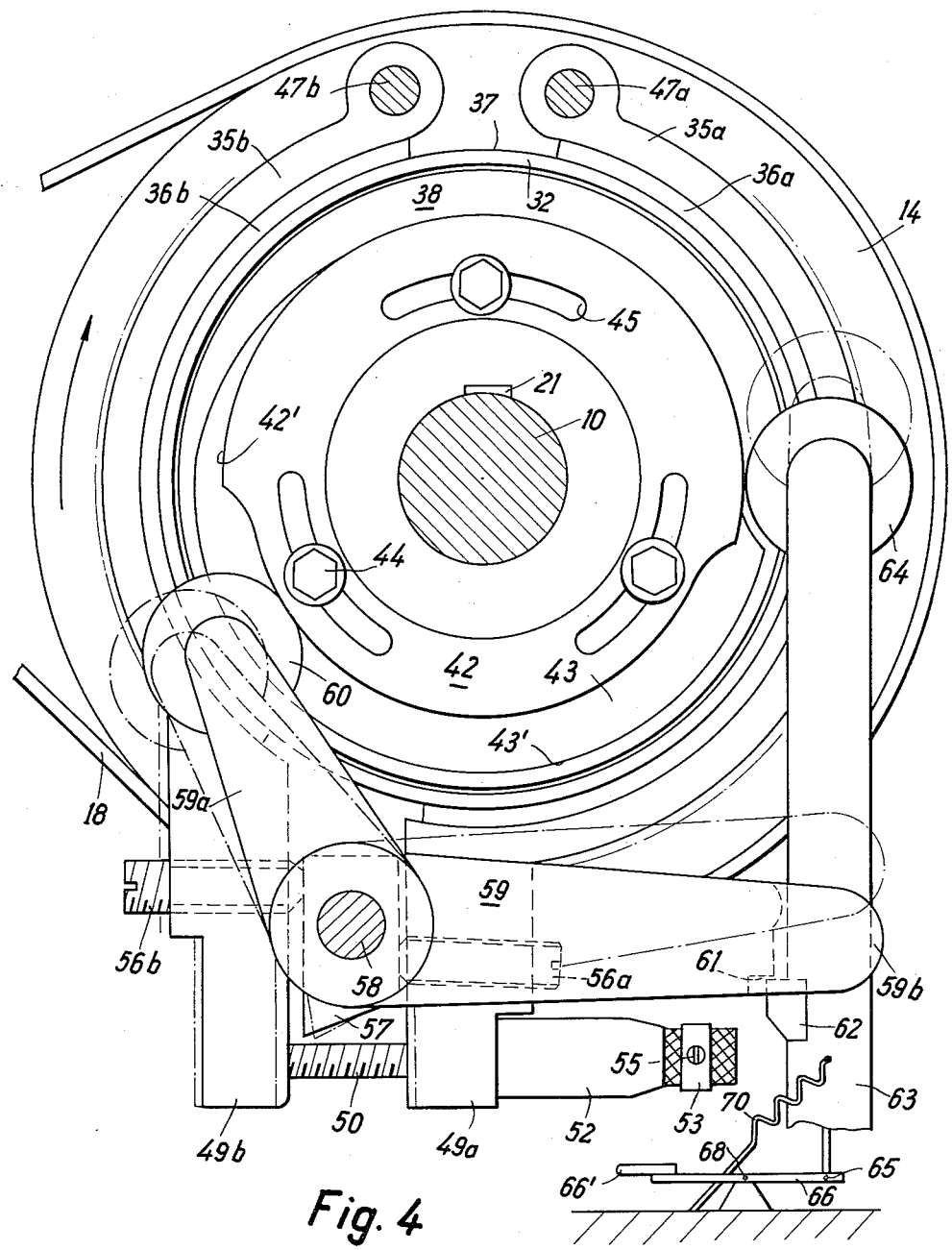
FIG. 4 is a cross-sectional view taken along line IV—IV of FIG. 1.
Figure 5:
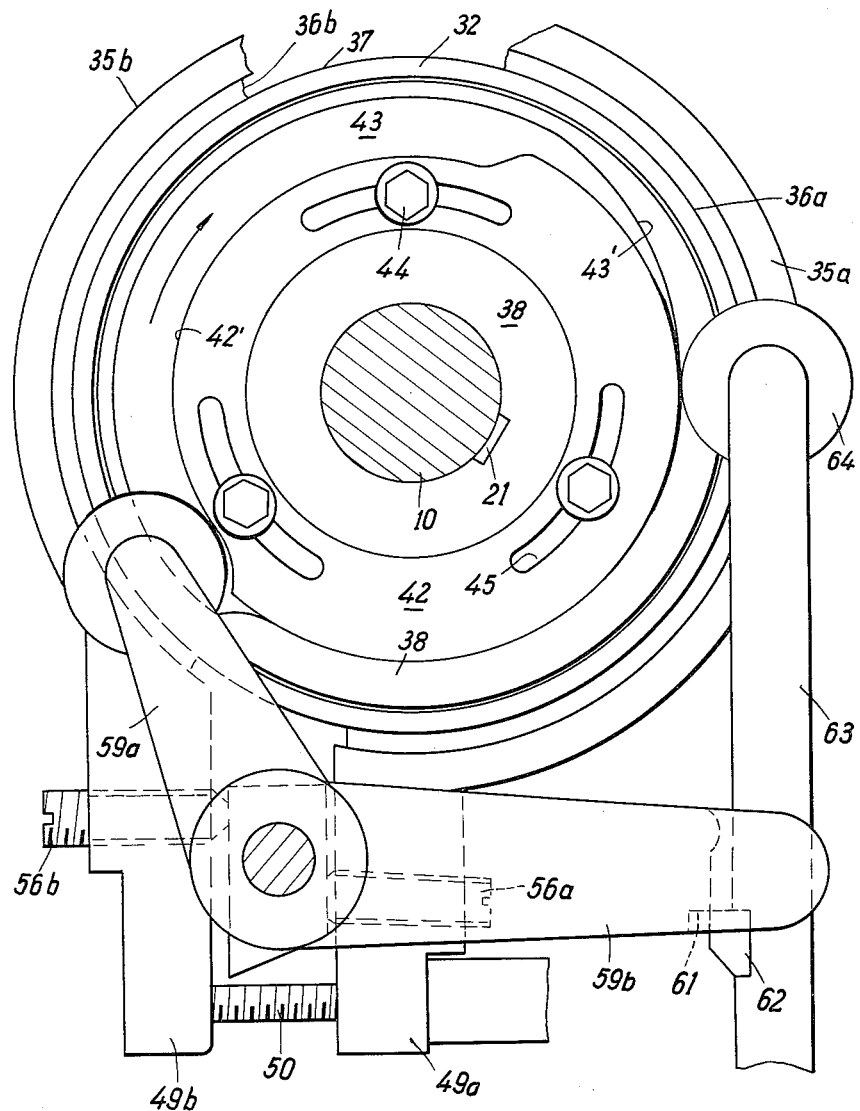
FIG. 5 is a view similar to FIG. 4, with the shaft thereof in another position.

The brake shoes 35a, 35b are provided with lugs 49a and 49b, respectively. A rod 50, best seen in FIGS. 4 and 5, is threadedly received in lug 49b and passes through a bore 51 in lug 49a. The rod 50 terminates with its threaded extremity 50' in a knurled adjusting nut 53 which bears upon a spring 54 surrounding the rod 50 and is housed in a protective sleeve 52 fastened to lug 49a. The spring 54 thus urges the two lugs 49a, 49b toward each other to close the brake in the absence of other forces. The tension on the brake may be adjusted by the rotation of nut 53 on the threaded end 50' after a loosening of one or more setscrews 55 engaging the rod 50. The lugs 49a, 49b carry adjustable contact screws 56a, 56b, respectively, adapted to bear upon a cam block 57 rigidly secured to a double-arm brake-releasing lever 59, serving as an operating member for block 57. The lever 59 is rotatably mounted on a shaft 58. One arm 59a of this lever is provided with a follower roller 60 journaled thereon and urged against the curved surface 42' of a cam ring 42. The latter is adjustably secured, together with a second cam ring 43, to the disk 38. Cam ring 42 is provided with annualr slots 45 while cam ring 43 has bores 46 through which pass securing and adjusting bolts 44. The other arm 59b of brake-releasing lever 59 carries a stop 61 adapted to be engaged by a lug 62 secured to an actuating rod 63. A follower roller 64, journaled on rod 63, contacts the convex surface 43' of cam ring 43.

The actuating rod 63 is connected to a tripping mechanism adapted to initiate the engagement of the clutch. This mechanism, schematically shown in FIGS. 4 and 6, comprises a bar 66 fulcrumed at 68 and connected to the rod 63 at a pivot 65. The bar 66 is provided with a treadle 66' adapted to be depressed by foot to actuate the clutch. A tension spring 70 is shown secured to rod 63 to urge the cam roller 64 inwardly against cam surface 43' while tending to move the rod 63 downwardly. The adjustable contact screws 56a, 56b permit individual resetting of each brake shoe to compensate for brake-lining wear.

With brake shoes 35a, 35b securely gripping the control ring 32, flywheel 14 with its flange 30 rotates in a clockwise direction (as viewed in FIG. 2) while the load shaft 10 remains stationary. The spring 41 is in a compressed state, so bearing upon the ring 32 and upon the limit disk 38 as to tend to rotate this ring (which is keyed to shaft 10) clockwise on the shaft, i.e. in the sense of rotation of flywheel 14. Clutch segments 28 are withdrawn from engagement with the flywheel and the clutch is thus disengaged. The cams 42, 43 are in the positions shown in FIG. 4.

When the treadle 66' is depressed, the actuating rod 63 is moved upwardly to the dot-dash position thereof, thus engaging by its lug 62 the stop 61 of brake-releasing lever 59 and shifting it to its operated (dot-dash) position. The cam block 57 is thereby rotated counterclockwise to spread the lugs 49a, 49b of brake shoes 35a, 35b against the restoring force of spring 54, thereby releasing the brake. This operation permits the compressed spring 41 to impart a limited angular motion to ring 32 relative to the limit disk 38 and the clutch body 20. The angular motion of control ring 32 swings the links 23, whose studs 25' are received in the sliding blocks 33, clockwise (FIG. 2) within the recesses 24 of the clutch body 20. Clutch segments 28 are thus firmly pressed against the continuously rotating flywheel 14 which now transmits its torque to the shaft 10 keyed thereto, so as to entrain them along with limit disk 38 and switch ring 32 in a clockwise direction (FIG. 2). The rotation of the shaft 10 may be transmitted to the working member by a transmission known per se. Thereafter the brake shoes 35a, 35b re-engage the control ring 32, causing it to lag behind the shaft 10 whose continuing rotation, due to the momentum of the load, permits the clutch body 20 to overrun the control ring slightly, thus causing the links 23 to swing counterclockwise and to withdraw the segments 28 from frictional engagement with the flywheel. The resulting relative rotation between the control ring 32 and the limit disk 38 recompresses the clutch-actuating spring 41 between block 39 and web 40. When the spring 41 is partially compressed, the web 40' of ring 32 engages the abutment 39' carried by the limit disk 38 to prevent further relative rotation therebetween and to communicate the action of brake 35a, 35b to the disk and the shaft 10 keyed thereto. It will be readily apparent, therefore, that the brake has the dual function of disengaging the clutch and arresting the load shaft upon such disengagement.

The cam rings 42, 43 are designed to control the time of engagement and disengagement of the clutch. With the double-arm lever 59 in the dot-dash position shown in FIG. 4, the clockwise rotation of flywheel 14 with entrainment of shaft 10 and limit disk 38 drives the cam rings 42, 43 in the same sense. The operator, to initiate a working cycle, must maintain the treadle in its depressed position for an angular rotation of the shaft 10 approximately 120° from its starting position shown in FIG. 4. During this period the operator may, upon noticing any untoward conditions, remove his foot from the treadle to brake the load shaft and to prevent the descent of the ram. After the position shown in FIG. 5 has been reached, the large-radius dwell of cam 42 passes under the roller 60 to maintain the double-arm lever 59 in its off-normal or brake-releasing position. The brake is thus locked in its open position (FIG. 6) to insure the continued engagement of the clutch for the duration of the ram stroke. At the conclusion thereof, i.e. after almost a full revolution from the position of FIG. 4, the rotation of the shaft 10 and of cam ring 42 restores the brake to an engaged position, thereby releasing the clutch. When the cam ring has freed the lever 59 for return to normal, under the control of spring 54, further rotation of load shaft 10 occurs while the spring 41 is recompressed and the load braked to a standstill as described above. Thus, the smaller-radius dwell of cam ring 42 extends, in the embodiment illustrated, over an angle of approximately 150° to afford the desired safety zone of 120° within which the operation of treadle 66 can be reversed without passage of the system through an operating cycle; the large-radius dwell of this cam, accordingly, spans an arc of substantially 210°.

Figure 6:
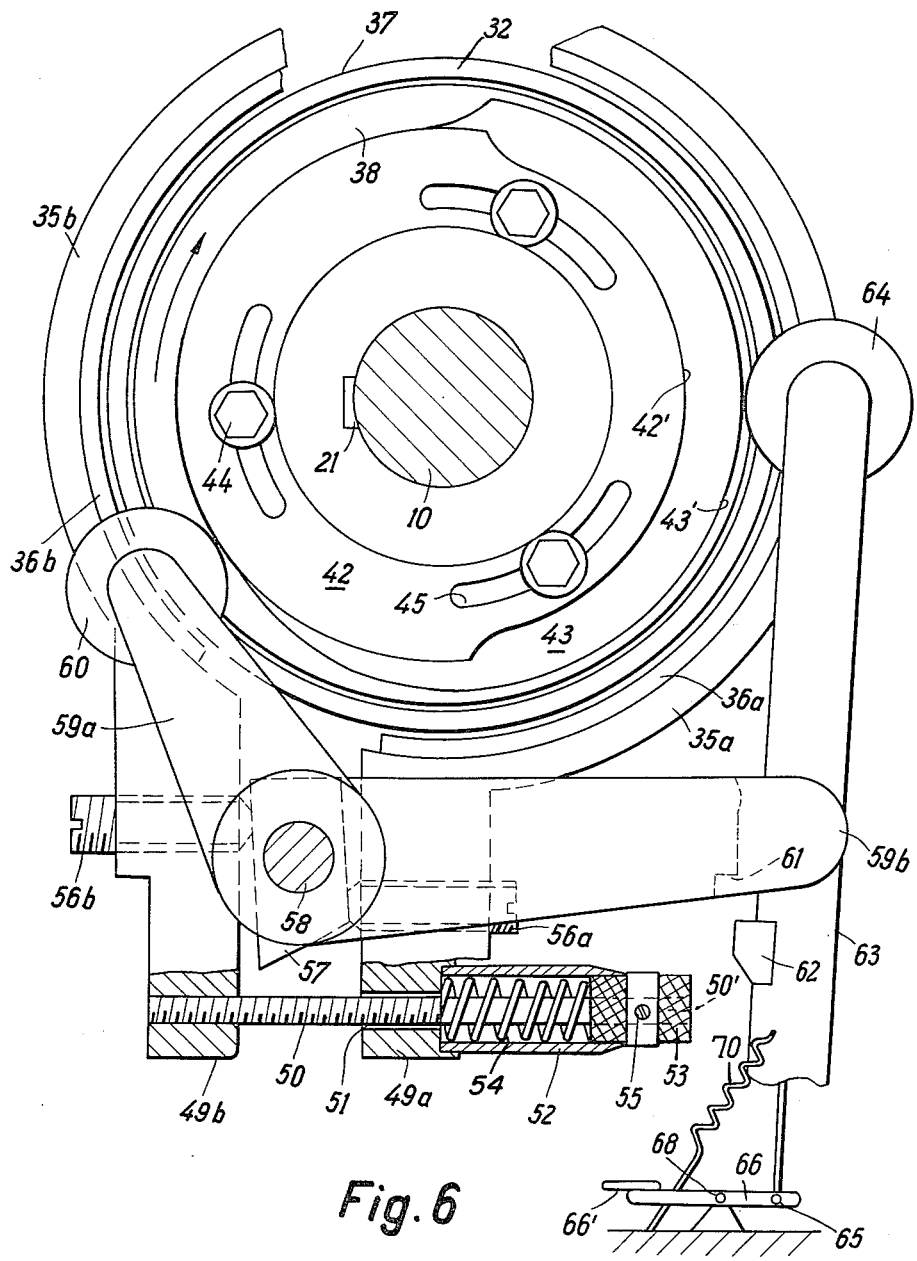
FIG. 6 is another view similar to FIG. 4, with the shaft thereof in a further position of rotation.

To prevent an inadvertent actuation of brake-releasing lever 59 while the shaft 10 is completing its cycle between the positions of FIGS. 6 and 4, i.e. during the braking of the load to standstill, the roller 64 of rod 63 is gradually cammed outwardly by surface 43' subsequently to the locking of lever 59 by the high dwell of cam surface 42' (FIG. 5). In this blocked position the lug 62 of rod 63 is not able to engage the stop 61 of lever arm 59b until, at the end of the cycle, the roller 64 steps off the high dwell of cam ring 43 (FIG. 4).

The position of FIG. 5, representing the final position at which the operator may halt the press operation by releasing the treadle prior to the locking-open of the brake, is advantageously chosen to be at or near the upper dead center of the ram.

The follower rollers 60 and 64 may be composed of a sound-deadening material, such as a thermoplastic, for silent operation of the clutch.

The invention illustrated and described admits of many modifications and variations within the ability of persons skilled in the art and intended to be included within its spirit and scope, except as further limited by the appended claims.

I claim:

1. A friction-clutch assembly comprising a driving member with an annular peripheral portion adapted for continuous rotation, a load shaft co-axial with said peripheral portion, a cylindrical body mounted concentrically with said peripheral portion on said shaft for entrainment thereby, a control element mounted on said shaft with freedom of limited rotation relative thereto, a plurality of clutch segments angularly spaced on said element, a plurality of swingable links each articulated to a respective clutch segment and to said body, said segments being movable toward said peripheral portion for rotative entrainment of said element by said member upon a rotation of said element relative to said shaft in the direction of rotation of said member, a support connected with said shaft for joint rotation, resilient means anchored to said support and to said element in a sense tending to rotate said element in said direction for a sufficient distance to produce torque-transmitting contact between said peripheral portion and said segments whereby said element and said shaft are rotated in unison with said member, brake means engageable with said element for causing the latter to lag behind said shaft against the force of said resilient means, thereby disengaging said segments from said peripheral portion, co-acting abutments on said element and on said shaft disposed for positive interengagement upon a rotational lag of said element behind said shaft sufficient to detach said segments from said peripheral portion, thereby communicating the action of said brake means to said shaft, a plurality of angularly spaced blocks radially slidable in said element and positively held therein against relative angular displacement, said links being provided with studs respectively journaled in said blocks.

2. An assembly according to claim 1 wherein each of said links has two cylindrical extremities journaled in complementary recesses of said body and a corresponding segment, respectively, and surrounded thereby over more than 180° so as to be positively held by said body and said corresponding segment.

3. An assembly according to claim 1 wherein said element is a ring, said brake means comprising a pair of brake shoes positioned to bear upon the outer periphery of said ring, spring means tending to contract said brake shoes, spreader means engageable with parts of said brake shoes for separating them against the action of said spring means, an operating member for said spreader means, and rotatable cam means coupled with said shaft for entrainment thereby and engageable with said operating member for holding same in spreader-operating position over a predetermined portion of a revolution of said shaft preceding a stopping position.

4. An assembly according to claim 3, further comprising actuating means for said operating member and cam means coupled with said shaft and engageable with said actuating means for inactivating the latter for a limited part of a shaft revolution upon the approach of said stopping position, thereby insuring re-operation of said brake means prior to reactuation of said operating member.

5. A friction-clutch assembly comprising a driving member adapted for continuous rotation, a load shaft, a clutch element carried on said shaft with freedom of limited relative rotation for coupling engagement with said member upon forward rotation on said shaft, force-storing means tending to impart such forward rotation to said element, thereby causing entrainment of said clutch element and said shaft by said member, normally effective brake means engageable with said clutch element for retarding its rotation with respect to said shaft and disengaging it from said driving member, and automatic operating means coupled with said shaft for rendering said brake means ineffective and subsequently reactivating same in a predetermined angular position of said shaft; said operating means including first and second rotatable cam means coupled with said shaft for entrainment thereby, a source of brake-applying force, brake-releasing means adapted to counteract said force, and locking means controlled by said first cam means for holding said brake-releasing means operated over a predetermined portion of a shaft revolution preceding said angular position, manual actuating means for said brake-releasing means normally engageable therewith, and blocking means controlled by said second cam means for keeping said actuating means out of engagement with said brake-releasing means for a limited part of a shaft revolution upon rotation of said shaft past said angular position toward a starting position beyond said angular position, thereby insuring deactivating of said brake-releasing means prior to re-operation of said actuating means.

6. An assembly according to claim 5 wherein said first cam means is shaped and positioned to render said locking means effective to operate said brake-releasing means after an initial rotation of at least 90° out of said starting position and to inactivate said brake-releasing means after a further rotation of at least 180°.

References Cited in the file of this patent

FOREIGN PATENTS

| | | |
|---|---|---|
| 301,015 | Italy | Sept. 23, 1932 |
| 1,111,063 | France | Oct. 26, 1955 |